United States Patent [19]
Kumano et al.

[11] Patent Number: 5,706,210
[45] Date of Patent: Jan. 6, 1998

[54] NETWORK MONITORING DEVICE

[75] Inventors: Satoshi Kumano; Junichi Shimada, both of Kawasaki, Japan

[73] Assignee: Fujitsu Limited, Kanagawa, Japan

[21] Appl. No.: 538,445

[22] Filed: Oct. 3, 1995

[30]     Foreign Application Priority Data

Mar. 1, 1995 [JP] Japan ..................... 7-041902

[51] Int. Cl.$^6$ .................................. H04L 12/28
[52] U.S. Cl. .................... 364/514 C; 395/200.11
[58] Field of Search ............... 364/514 C, 550; 340/825.06, 825.08; 395/200, 909, 200.11

[56]           References Cited

U.S. PATENT DOCUMENTS

| | | |
|---|---|---|
| 4,928,246 | 5/1990 | Crawley et al. ............... 364/514 C |
| 4,962,473 | 10/1990 | Craiu ................................ 364/514 C |
| 5,436,909 | 7/1995 | Dev et al. ......................... 371/20.1 |

*Primary Examiner*—James P. Trammell
*Assistant Examiner*—Thomas Peeso
*Attorney, Agent, or Firm*—Helfgott & Karas, P.C.

[57]              ABSTRACT

A network monitoring system having at least one monitoring device and a plurality of transmission devices connected to a network includes a first data storage unit, provided in the at least one monitoring device, which stores first status information of all of the transmission devices, and an information attaching unit, provided in the at least one monitoring device, which attaches abridged status information of at least one of the transmission devices to a polling command and sends the polling command to the at least one of the transmission devices, wherein the abridged status information is generated to reflect the first status information. The network monitoring system further includes a second data storage unit, provided in each of the transmission devices, which stores second status information of a corresponding one of the transmission devices, and a comparison unit, provided in each of the transmission devices, which checks if there is a mismatch between the abridged status information of a corresponding one of the transmission devices and the second status information.

23 Claims, 13 Drawing Sheets

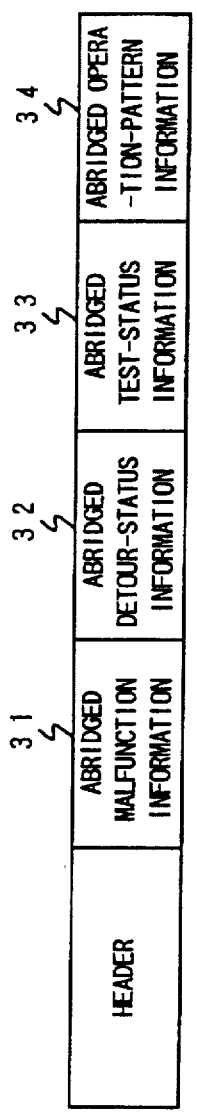
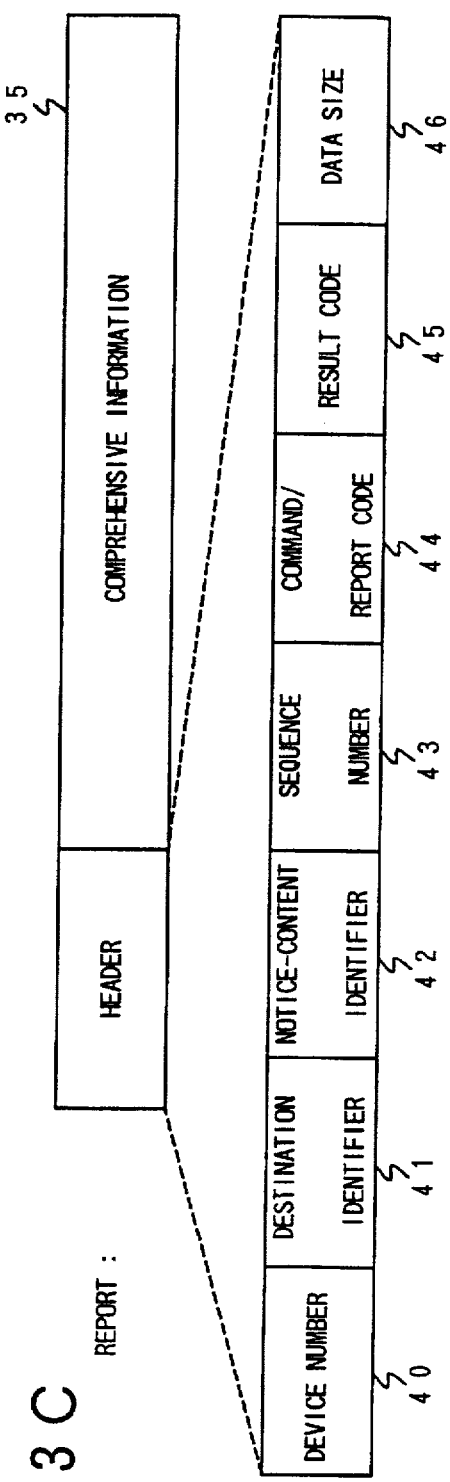
FIG. 3A POLLING COMMAND
FIG. 3B RESPONSE
FIG. 3C REPORT

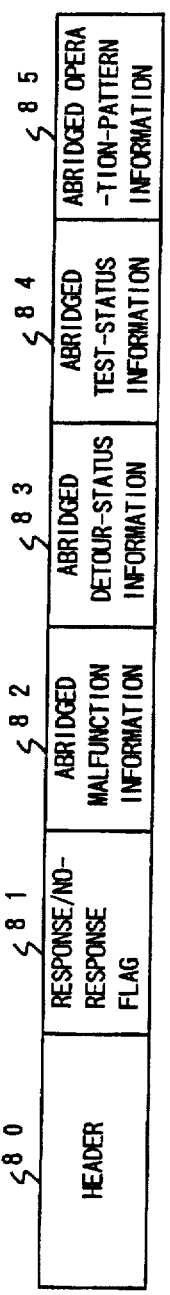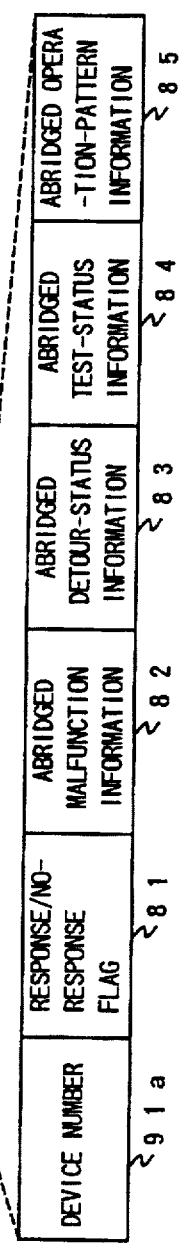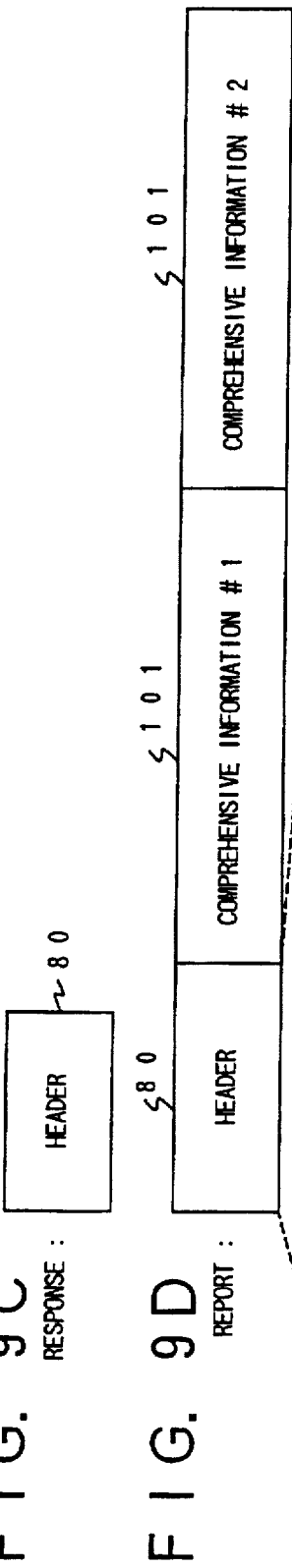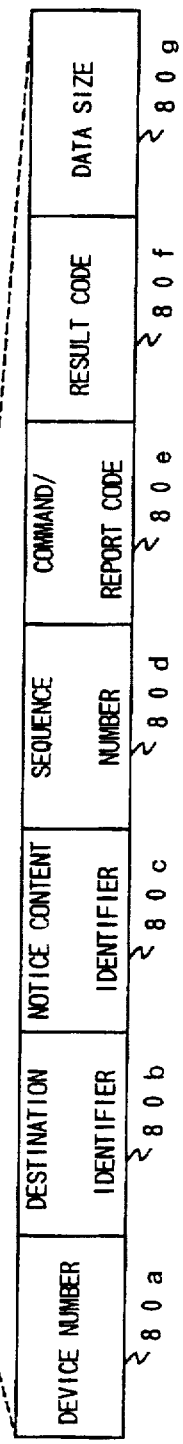

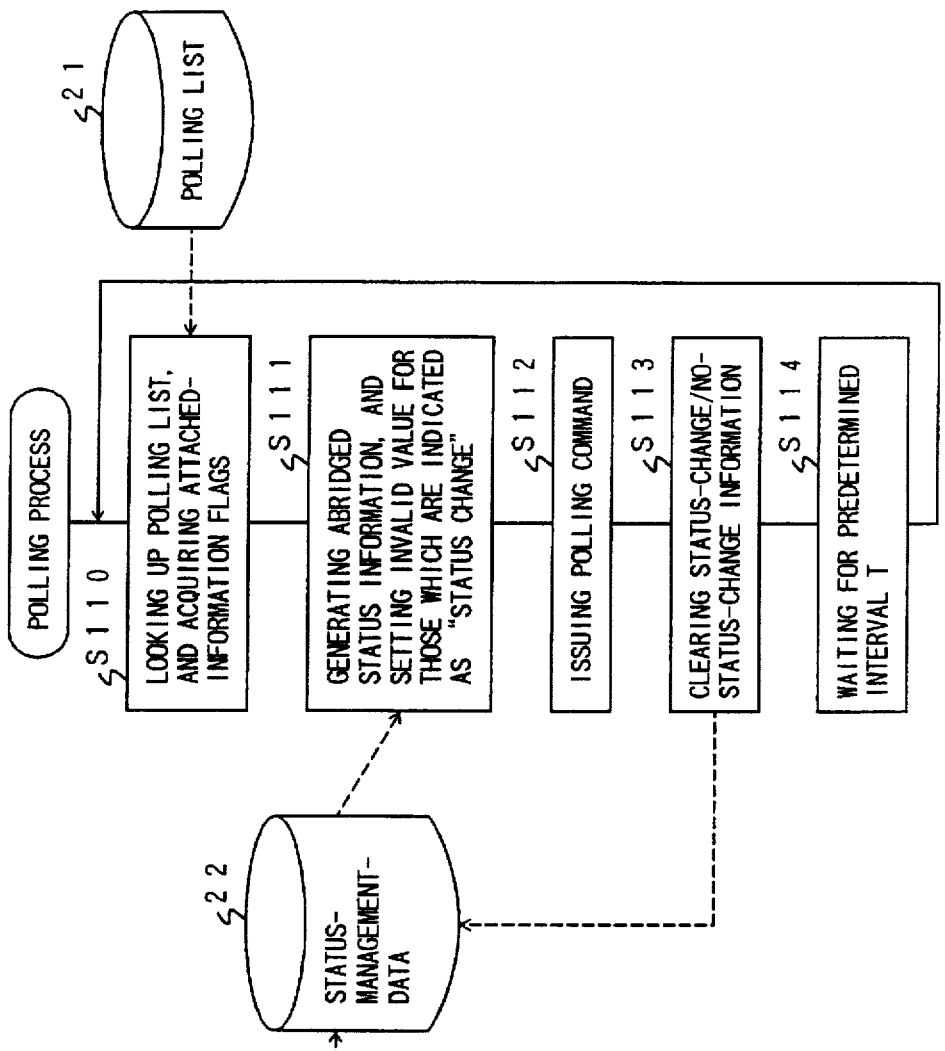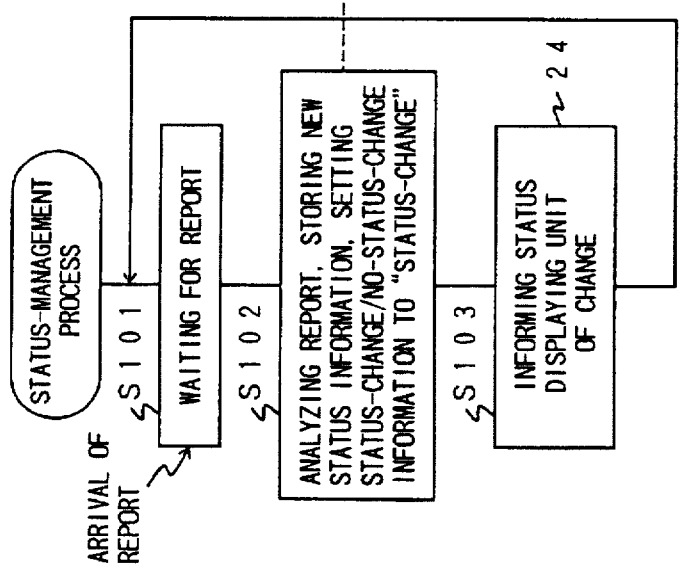

| TIMING | DEVICE | ABRIDGED STATUS INFORMATION |
|---|---|---|
| (A) | #1 | NUMBER OF MALFUNCTIONS |
| (B) | #2 | NUMBER OF TESTS |
| (C) | #3 | NUMBER OF DETOURS |
| (D) | #1 | OPERATION-PATTERN NUMBER |

FIG. 14

| TIMING | TRANSMISSION DEVICE #1 | | TRANSMISSION DEVICE #2 | | TRANSMISSION DEVICE #3 | |
|---|---|---|---|---|---|---|
| | RESPONSE/ NO-RESPONSE | ABRIDGED STATUS INFORMATION* | RESPONSE/ NO-RESPONSE | ABRIDGED STATUS INFORMATION* | RESPONSE/ NO-RESPONSE | ABRIDGED STATUS INFORMATION* |
| (A) | NO | MDTO | NO | MDTO | — | — |
| (B) | YES | MDTO | NO | MDTO | NO | MDTO |
| (C) | NO | IDTO | NO | MDTO | NO | xxxx |

NETWORK MONITORING DEVICE

BACKGROUND OF THE INVENTION

1. Field of the Invention

The present invention generally relates to network monitoring systems, and particularly relates to a status matching processing system used for monitoring a network.

Recent diversification of a size and a form of networks has given rise to a need for monitoring devices used for controlling and monitoring the networks. Such monitoring devices include devices which collect and match status information of the networks through periodic polling. However, a time interval for polling a given device increases with an increase in the number of transmission devices connected to a network, and so does a time needed for collecting the status information of the network. This results in a low reliability of the monitoring devices. Thus, it is required to develop a system which can collect and match the status information of a network reliably, regardless of the number of the transmission devices connected to the network.

2. Description of the Related Art

FIG. 1 shows a block diagram of a network system. In FIG. 1, the network system includes a plurality of transmission devices 1 for transmitting data, a transmission line 2 for connecting the transmission devices 1, and a monitoring device 3 for monitoring status of the transmission devices 1 under its supervision. A high-speed digital line (e.g., 64 kbps to 6 Mbps), for example, is used as the transmission line 2. Although the number of the transmission devices 1 shown in FIG. 1 is two, it can be any number. Also, the number of the monitoring devices 3 is not limited to one, but can be any number.

The transmission device 1 identified as #1 is connected to an external host 4 and an external PBX 5. The host 4 is provided at each key position, and the number of the host 4 is not limited to one. The PBX 5 is connected to a terminal 6 such as a telephone machine, a facsimile machine, etc. The transmission device 1 identified as #1 is connected to the monitoring device 3 via a monitoring line 8, and the transmission device 1 identified as #2 is connected to the PBX 5 and a data processing device 7. In the system having this configuration, communications of commands (CMD), responses (RSP) and reports (RPT) are carried out as follows.

CMD refers to a request for a report on the status, which request is sent from the monitoring device 3 to the transmission devices 1. RSP refers to the response responding to the request, which response is sent from the transmission devices 1 to the monitoring device 3. RPT refers to various reports, which are sent from the transmission devices 1 to the monitoring device 3 and all the other transmission devices 1 connected to the network. RPT is multi-address and one-way communication, and does not require any response.

Operation of the Monitoring Device a) The monitoring device 3 generates the command CMD, transmits it to the transmission device 1 directly connected thereto, and switches into a mode for waiting for the response RSP.

b) When the monitoring device 3 receives the response RSP from the transmission device 1 directly connected thereto, the monitoring device 3 ends a process regarding the transmitted command CMD.

c) When the monitoring device 3 receives the report RPT from the transmission device 1 directly connected thereto, the monitoring device 3 decides an origin of the report RPT based on contents thereof, and updates the status information regarding the transmission device 1, which information is kept by the monitoring device 3.

Operation of the Transmission Device

1) First Case (in which the transmission device 1 receives the command CMD directed thereto from the monitoring device 3 directly connected thereto.)

a) In response to the command CMD sent from the monitoring device 3 directly connected thereto, the transmission device 1 decides whether the command CMD is directed to itself.

b) When the command CMD is directed to itself, the transmission device 1 carries out a predetermined process, and sends the response (RSP) to the monitoring device 3 at the end of the process.

c) The transmission device 1 sends the report RPT when there is a change in the status thereof, but does not send the report RPT when there is no change.

2) Second Case (in which the transmission device 1 receives the command CMD directed to another transmission device 1 from the monitoring device 3 directly connected thereto.)

a) In response to the command CMD sent from the monitoring device 3 directly connected thereto, the transmission device 1 decides whether the command CMD is directed to itself.

b) When the command CMD is directed to other than itself, the transmission device 1 sends the command CMD to the transmission line 2 connected thereto.

3) Third Case (in which the transmission device 1 receives the command CMD directed thereto via the transmission line 2.)

a) In response to the command CMD sent from an adjacent transmission device 1, the transmission device 1 decides whether the command CMD is directed to itself.

b) When the command CMD is directed to itself, the transmission device 1 carries out a predetermined process, and sends the response (RSP) to the transmission line 2 at the end of the process.

c) The transmission device 1 sends the report RPT when there is a change in the status thereof, but does not send the report RPT when there is no change.

4) Fourth Case (in which the transmission device 1 receives via the transmission line 2 the command CMD directed to another transmission device 1.)

a) In response to the command CMD sent from an adjacent transmission device 1, the transmission device 1 decides whether the command CMD is directed to itself.

b) When the command CMD is directed to other than itself, the transmission device 1 sends the command CMD to all the transmission line(s) 2 connected thereto.

FIG. 2 is a block diagram of a network monitoring system of the related art. In FIG. 2, the same elements as those in FIG. 1 are referred to by the same numerals, and a description thereof will be omitted.

In FIG. 2, there are three transmission devices 1. The transmission device 1 identified as #1 is connected to the monitoring device 3 via the monitoring line 8. The transmission devices 1 are connected with each other via the transmission lines 2 and a network port 10. Each of the transmission lines 2 is provided with a predetermined frequency band specifically used for exchanging monitoring information between the transmission devices 1.

The monitoring device 3 includes a polling unit 20, a polling-list storage unit 21, a status-management-data storage unit 22, a status-management unit 23, a status displaying unit 24, and a communication unit 25. The polling unit 20 carries out a polling process by sending polling commands to the transmission devices 1, and collects abridged status information of the transmission devices 1 by receiving responses from the transmission devices 1. The polling-list storage device 21 stores a polling list which contains addresses of all the transmission devices 1 connected to the network. This polling list is used by the polling unit 20.

The status-management-data storage unit 22 stores the status-management data which is used for managing and storing the status information of the transmission devices 1. The status-management unit 23 analyzes a report on a status change sent from the transmission devices 1, and, also, analyzes the responses which the polling unit 20 collects from the transmission devices 1. The status displaying unit 24 updates status on a display 26, when the status-management unit 23 notifies the status displaying unit 24 of the status change reported in the report. The communication unit 25 is used for communicating with the transmission devices 1.

As described before, the monitoring device 3 is connected with one of the transmission devices 1, and communicates with each of the other transmission devices 1 via the transmission lines 2. By doing so, the monitoring device 3 collects the status information from the transmission devices 1.

Each one of the transmission devices 1 includes a status-management unit 11, a status-management-data storage unit 12, a card firm 13, a communication unit 14, and the network port 10. The status-management unit 11 monitors the status of the transmission device 1, and informs the monitoring device 3 of the status by means of the report or the response. The status-management-data storage unit 12 stores the status-management data which contains the status information of a pertinent transmission device 1. The card firm 13 controls cards which are used for providing various interfaces. The communication unit 14 is used for communicating with the monitoring device 3. The network port 10 is used for communicating with the other transmission devices 1.

In FIG. 2, "a" refers to a polling-list-reference operation, "b" refers to a polling/status-matching-command issuing operation, "c" refers a polling/status-matching-response receiving operation, "d" refers to a status-information notifying operation, "e" refers to a management-information check (comparison) operation, "f" refers to a status-change notifying operation, "g" refers to a status-management-data reference operation, "h" refers to a report receiving operation, "j" refers to a status-information storing operation, "k" refers to a command receiving operation, "l" refers to a status-management-data reference operation, "m" refers to a response/report sending operation, "n" refers to a status-change notifying operation, "o" refers to a status-information storing operation, and "p" refers to a communication with the other transmission devices 1.

In the system having this configuration, the monitoring device 3 knows the status of the network through the reports, which the transmission devices 1 voluntarily send when there is a change in the status. Also, the monitoring device 3 checks whether the status information kept in the monitoring device 3 matches the abridged status information of each of the transmission devices 1 collected through periodic polling. Here, the abridged status information is a streamlined version of the status information, and has a data size much smaller than the status information itself.

The change in the status of the transmission device 1 is generally detected by the card firm 13, and is reported to the status-management unit 11. The change in the status is then stored in the status-management-data storage unit 12, and, also, is sent to the monitoring device 3 via the communication unit 14 as the status-change report. The monitoring device 3 receiving this report hands it over to the status-management unit 23. The status-management unit 23 stores the contents of the report in the status-management-data storage unit 22, and notifies the status displaying unit 24 of the change in the status. The status displaying unit 24 looks up the status-management-data storage unit 22, and updates the status displayed on the display 26.

A description of the polling process will be given below. The polling unit 20 issues the polling command at constant intervals via the communication unit 25 by using the polling list stored in the polling-list storage unit 21. Upon receiving the polling command, the transmission device 1 lets the status-management unit 11 collect the abridged status information of the transmission device 1 stored in the status-management-data storage unit 12, and sends the response to the monitoring device 3 via the communication device 14.

FIGS. 3A through 3C show examples of formats of the polling command, the response, and the report, respectively. As shown in FIG. 3A, the polling command is made up from only a header 30. The header 30 has the same data format for the polling command, the response, and the report. As shown in FIG. 3B, the response includes abridged malfunction information 31, abridged detour-status information 32, abridged test-status information 33, and abridged operation-pattern information 34 following the header 30. As shown in FIG. 3C, the report includes comprehensive information 35 following the header 30. This comprehensive information 35 includes at least one of malfunction information, detour-status information, test-status information, and operation-pattern information.

The header 30 includes a device number 40, a destination identifier 41, a notice-content identifier 42, a sequence number 43, a command/report code 44, a result code 45, and a data size 46. The device number 40 is a number which is uniquely assigned to each of the transmission devices 1 in the network, and is 0xFFFF in the case of the multi-address communication. The destination identifier 41 is "1" for the transmission device 1 and "2" for the monitoring device 3. The notice-content identifier 42 is "1" for the command, "2" for the response, and "3" for the report. The sequence number 43 is "0x0000" for one frame, is usually "0x1001" to "0x10FF" for more than one frame, and is "0x01XX" for the last frame (X is an arbitrary number). The command/report code 44 is a code used for identifying the command and the report. The result code 45 shows a result of the command. The data size 46 shows a data size of the portion following the header 30.

Upon receiving the response, the polling unit 20 compares the content of the response with the status information of a corresponding transmission device 1 kept in the status-management-data storage unit 22. When there is a difference between these two, the polling unit 20 sends to the corresponding transmission device 1 via the communication unit 25 a command for acquiring updated information relating to the difference. Upon receiving the updated information from the corresponding transmission device 1, the polling unit 20 passes the content of the updated information to the status-management unit 23, which in turn stores the updated information in the status-management-data storage unit 22.

In this manner, the monitoring device 3 acquires the most recently updated information. This process of acquiring the updated information relating to the difference is hereinafter called a status-matching process. Also, the command for acquiring the updated information is hereinafter called a status-matching command.

Since the data size of the abridged status information is much smaller than that of the status information itself, transmission of the abridged status information is less costly than that of the status information. Thus, the abridged status information is first collected and used for checking whether there is a difference in the status information between the monitoring device 3 and the transmission device 1. If there is a difference, the updated status information relating to the difference should be collected to compensate for the difference. The abridged status information is just a streamlined version of the status information, and, thus, cannot be used for compensating for the difference.

The status-matching command issued for acquiring the updated information differs depending on the information to be acquired. The status-matching command includes a malfunction-information collecting command, a detour-status-information collecting command, a test-status-information collecting command, and an operation-pattern modifying command. When more than one of the above-identified information types shows a difference between the monitoring device 3 and the transmission devices 1, corresponding status-matching commands are issued one after another each time the response is received. The polling process serves not only to check a mismatch of the status information, but also to check based on the existence of the response whether the transmission devices 1 are being monitored.

FIG. 4 shows an operation sequence of the related-art system of FIG. 2. In the figure, solid arrows indicate the polling commands and the responses to them, and dotted arrows indicate the status-matching command and the responses to them. FIG. 4 shows a case in which three of the transmission devices 1 are connected to the monitoring device 3, and are identified as #1, #2, and #3.

The polling command and the response with regard to the transmission device #1 is indicated by (A). In this example, there is no difference in the status information between the transmission device #1 and the monitoring device 3.

The polling command and the response with regard to the transmission device #2 is indicated by (B). In this example, there is a difference in one of the malfunction information, the detour status, the test status, and the operation pattern between the transmission device #2 and the monitoring device 3. Since there is one difference in the status information, one status-matching command is issued, and one response is returned.

The polling command and the response with regard to the transmission device #3 is indicated by (C). In this example, there are differences in two of the malfunction information, the detour status, the test status, and the operation pattern between the transmission device #3 and the monitoring device 3. Since there are two differences in the status information, two status-matching commands are issued, and two responses are returned.

FIGS. 5A and 5B show flowcharts of processes of the monitoring device 3, which is used in the related-art system of FIG. 2. FIG. 5A shows a flowchart of the status-management process, and FIG. 5B shows a flowchart of the polling process.

In FIG. 5A, at a step S1, the status-management unit 23 waits for the report to be sent from the transmission devices 1. When the report is received, the procedure goes to a step S2.

At the step S2, the contents of the report are analyzed, and new status information based on the analysis is stored in the status-management-data storage unit 22. That is, the status information of the pertinent transmission device 1 is updated. Since the report is sent only when there is a status change in the transmission device 1, the status-management data should be updated under any condition.

At a step S3, the change in the status is reported to the status displaying unit 24. The status displaying unit 24 updates the status displayed on the display 26. The procedure repeats the sequence described above.

In FIG. 5B, at a step S10, the polling unit 20 looks up the polling list stored in the polling-list storage unit 21, and issues the polling command to a given transmission device 1.

At a step S11, the polling unit 20 waits for the response from the given transmission device 1. When the response is received, the procedure goes to a step S12. Upon receiving the polling command, the given transmission device 1 collects the abridged status information stored in the status-management-data storage unit 12, and sends it to the monitoring device 3 as the response.

At the step S12, the polling unit 20 checks whether the abridged status information collected from the given transmission device 1 matches the status information stored in the status-management-data storage unit 22. If there is no mismatch, the procedure goes to a step S16.

If it turns out at the step S12 that there is a mismatch, at a step S13, the polling unit 20 issues the status-matching command relating to the mismatched information. For example, if there is a mismatch in the malfunction information, the malfunction-information collecting command is issued.

At a step S14, the polling unit 20 lapses into a mode of waiting for the response. Upon receiving the status-matching, the status-management unit 11 of the given transmission device 1 reads pertinent information from the status-management-data storage unit 12, and sends it to the monitoring device 3 as the response.

At a step S15, the polling unit 20 receiving the response hands the status information over to the status-management unit 23. Then, the status-management unit 23 stores the status information in the status-management-data storage unit 22.

At a step S16, a check is made whether all necessary types of the updated information is collected to compensate for the mismatch. If it is not, the procedure goes back to the step S12, and repeats the steps S12 through S15 for another type of information (i.e., a remaining one of the malfunction information, the detour-status information, the test-status information, and the operation-pattern information). If all the necessary updated information is collected, the procedure goes to a step S17.

At the step S17, the polling unit 20 lapses into a waiting mode to wait for a predetermined time interval T. After the time interval T, the procedure goes back to the step S10, where the polling process restarts.

As described in the above, the monitoring device 3 of the network monitoring system of the related art detects a mismatch in the status information between the monitoring device 3 and the transmission device 1 by means of the response to the polling process. Then, the monitoring device 3 issues the status-matching command in order to acquire the updated information relating to the mismatch.

In this scheme, a time length which may pass from a cause of a mismatch to a detection of the mismatch is as long as NT seconds. Here, N is the number of the transmission devices 1 in the network, and T is an interval of the polling processes. Thus, the time length required for the detection of the mismatch increases in proportion to the size of the network. This is a main reason for a degradation of the reliability of the monitoring device 3. Also, the status-matching command for acquiring the updated information is issued each time the mismatch is detected. Thus, traffic on the monitoring line 8 and the communication line 2 is congested, and a complexity of the process of the monitoring device 3 increases.

Accordingly, there is a need in the field of the network monitoring for a network monitoring device which can reduce a time length required for the detection of a mismatch between a monitoring device and a transmission device.

Also, there is a need for a network monitoring device which can reduce the processing load on the monitoring device.

SUMMARY OF THE INVENTION

Accordingly, it is a general object of the present invention to provide a network monitoring device which can satisfy the need described above.

It is another and more specific object of the present invention to provide a network monitoring device which can reduce a time length required for the detection of a mismatch between a monitoring device and a transmission device.

It is yet another object of the present invention to provide a network monitoring device which can reduce the processing load on the monitoring device.

In order to achieve the above objects according to the present invention, a network monitoring system having at least one monitoring device and a plurality of transmission devices connected to a network includes a first data storage unit, provided in said at least one monitoring device, which stores first status information of all of the transmission devices, and an information attaching unit, provided in said at least one monitoring device, which attaches abridged status information of at least one of the transmission devices to a polling command and sends the polling command to said at least one of the transmission devices, wherein the abridged status information is generated to reflect the first status information. The network monitoring system further includes a second data storage unit, provided in each of the transmission devices, which stores second status information of a corresponding one of the transmission devices, and a comparison unit, provided in each of the transmission devices, which checks if there is a mismatch between the abridged status information of a corresponding one of the transmission devices and the second status information.

The network monitoring system as described above further includes a management unit, provided in each of the transmission devices, which sends the second status information relating to the mismatch to said at least one monitoring device if there is the mismatch, so that said at least one monitoring device can update the first status information.

In this manner, according to the present invention, the abridged status information of a given transmission device is attached to the polling command, so that a mismatch of the status information is detected on the side of the transmission device. Then, only the status information relating to the mismatch is sent when there is a mismatch, while nothing is reported otherwise. Thus, the processing load on the monitoring device can be reduced.

Also, the communication traffic between the monitoring device and the transmission devices is reduced, so that the reliability of the network and the monitoring device is enhanced.

Also, the abridged status information of a plurality of the transmission devices can be attached to the polling command to be used in the multi-address communication. Thus, a time length required for the detection of mismatches can be shortened.

Other objects and further features of the present invention will be apparent from the following detailed description when read in conjunction with the accompanying drawings.

BRIEF DESCRIPTION OF THE DRAWINGS

FIGS. 3A through 3C are illustrative drawings showing data formats of a polling command, a response, and a report, respectively, used in the network monitoring system of FIG. 2

FIGS. 9A through 9D are illustrative drawings showing data formats of two polling commands, a response to the polling command, and a status-matching report responding to the polling command, respectively;

FIGS. 10A and 10B are flowcharts of processes of a monitoring device of FIG. 7;

FIG. 14 is an illustrative drawing showing abridged status information corresponding to the example of FIG. 13.

DESCRIPTION OF THE PREFERRED EMBODIMENTS

In the following, a principle of the present invention will be described first with reference to the accompanying drawings.

Figure 1:
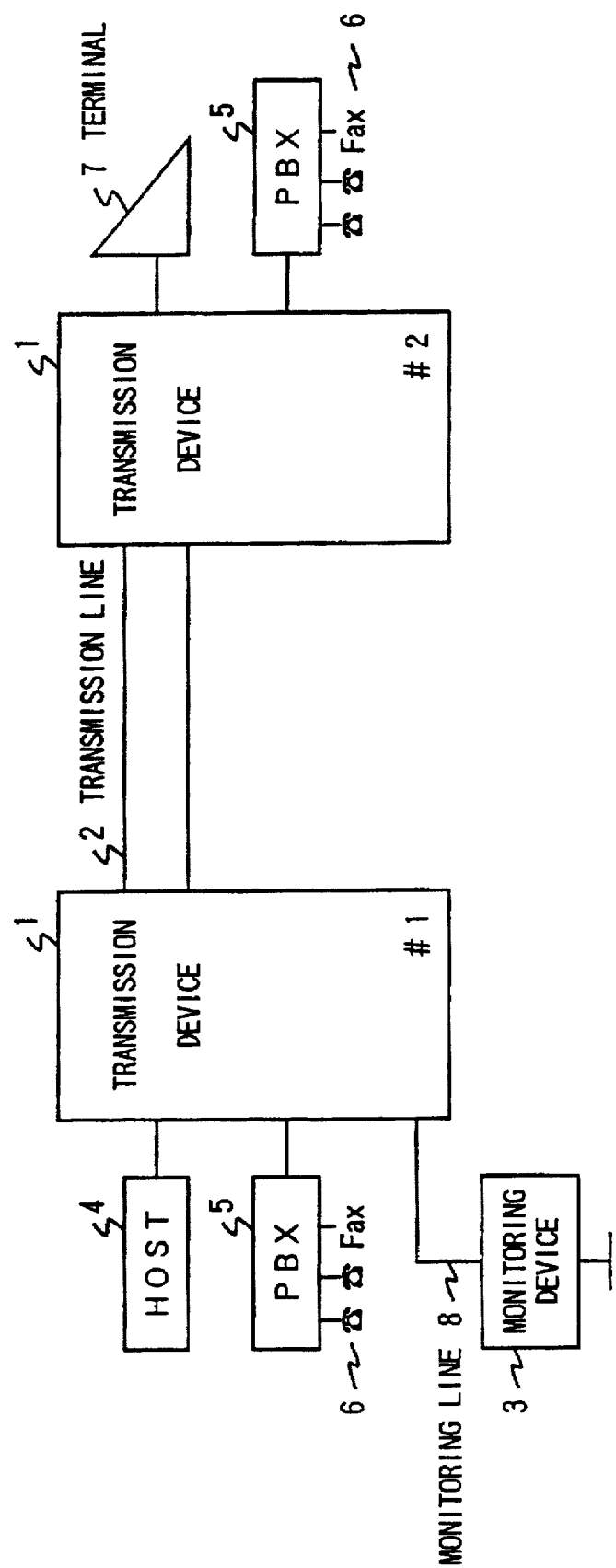
FIG. 1 is a block diagram of a network system of the related art.
Figure 2:
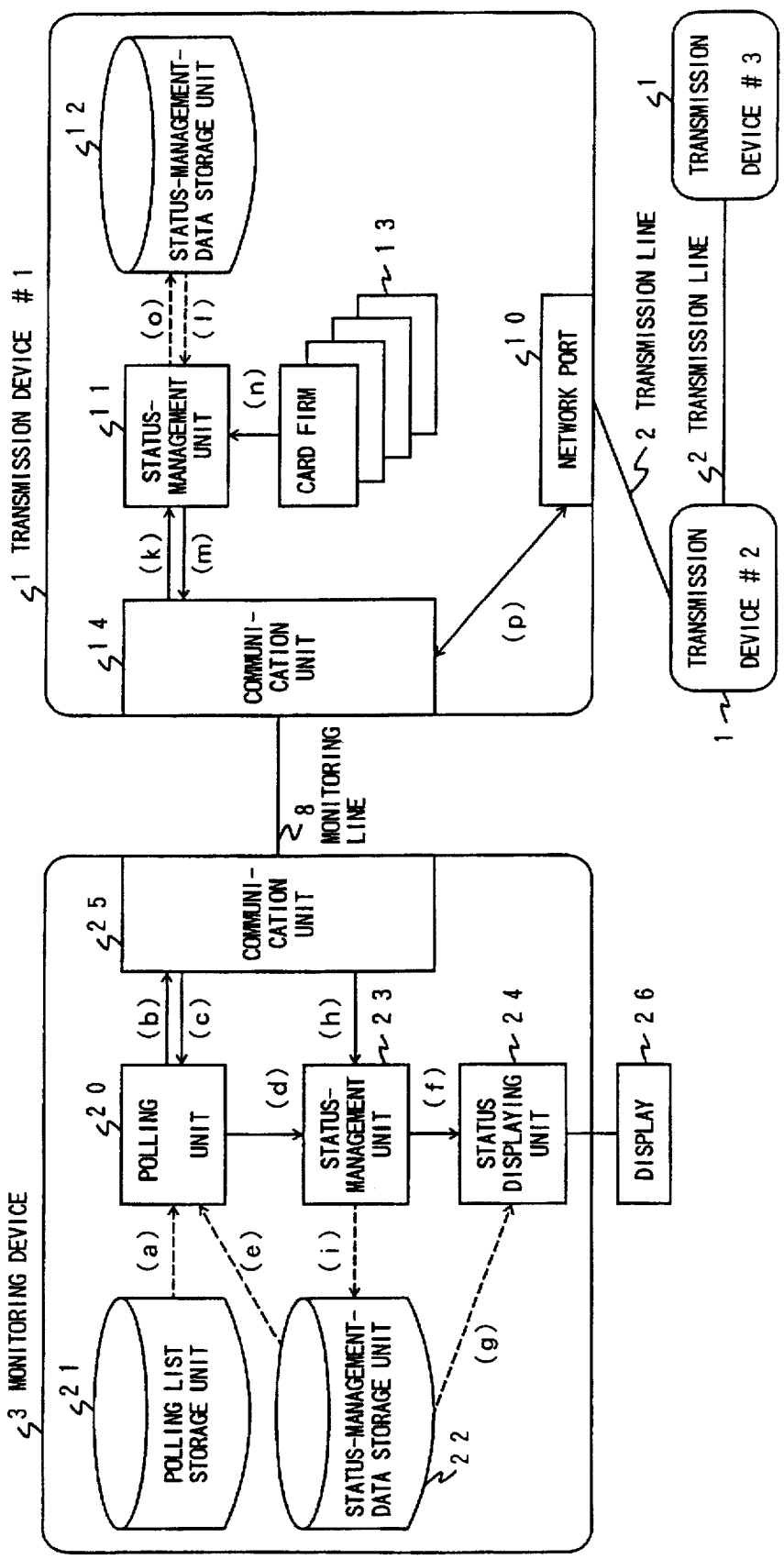
FIG. 2 is a block diagram of a network monitoring system of the related art.
Figure 4:
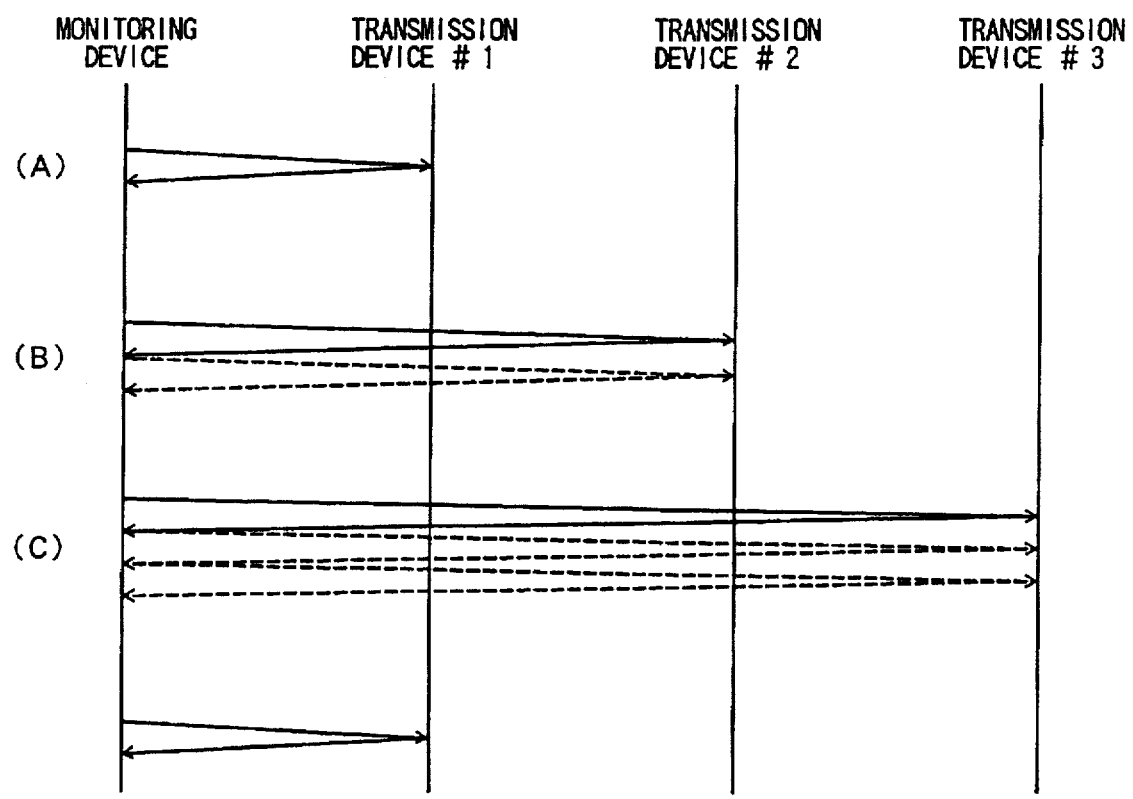
FIG. 4 is an illustrative drawing showing an operation sequence of the network monitoring system of FIG. 2.
Figure 6:
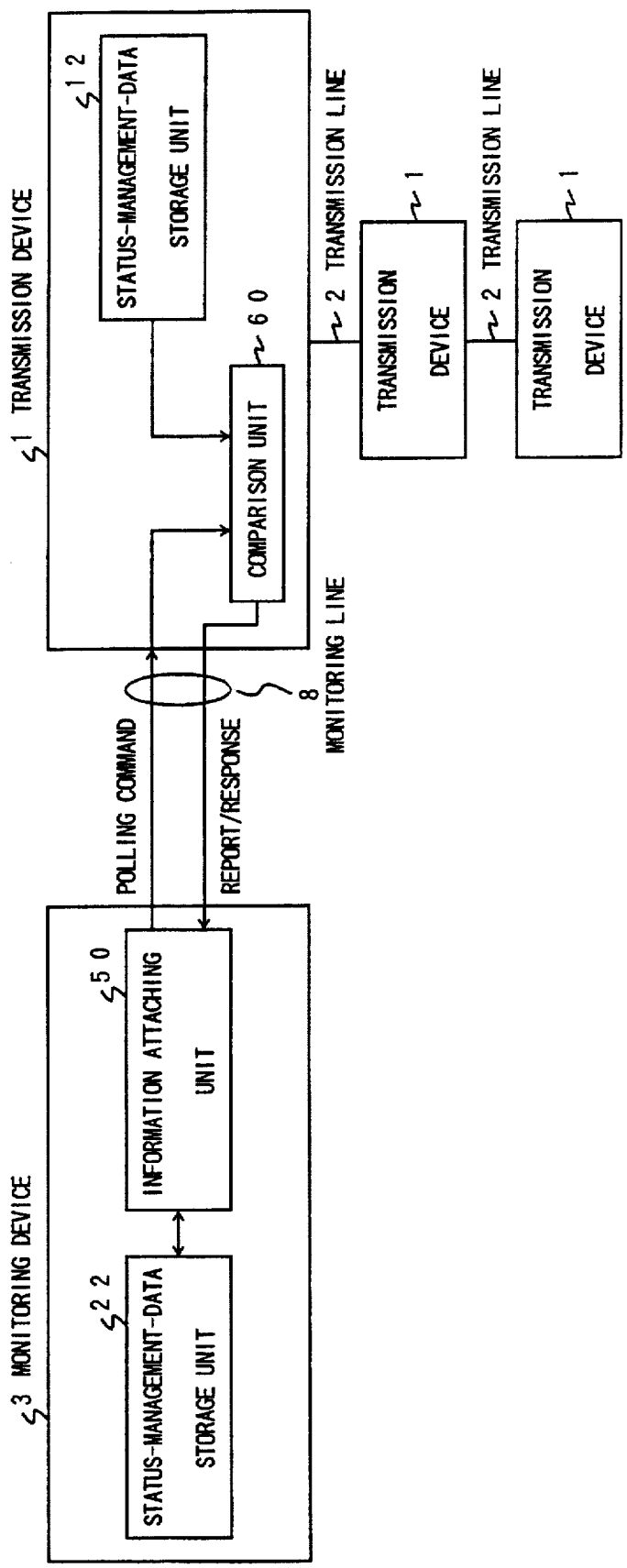
FIG. 6 is a block diagram of a network monitoring system according to a principle of the present invention.

FIG. 6 shows a block diagram of a network monitoring system according to the principle of the present invention. In FIG. 6, the same elements as those of FIG. 2 are referred to by the same numerals. The system of FIG. 6 includes a plurality of the transmission devices 1, the transmission lines 2 connecting between the transmission devices 1, and at least one monitoring device 3 provided for monitoring the network. The monitoring device 3 is connected to one of the transmission devices 1 via the monitoring line 8. The monitoring device 3 includes the status-management-data storage unit 22 storing the status information of all the transmission devices 1 under its supervision, and includes an information attaching unit 50 attaching the abridged status information of at least one of the transmission devices 1 to the polling command which is to be issued to said at least one of the transmission devices 1.

Each of the transmission devices 1 includes the status-management-data storage unit 12 storing the status information of a corresponding transmission device 1, and includes a comparison unit 60 which compares the abridged status information sent from the monitoring device 3 with the status information stored in the status-management-data storage unit 12.

In this case, the information attaching unit 50 attaches the abridged status information of a given transmission device 1 kept in the status-management-data storage unit 22 to the polling command which is to be sent to the given transmission device 1. The comparison unit 60 of the given transmission device 1 compares the status information of the given transmission device 1 stored in the status-management-data storage unit 12 with the abridged status information sent from the monitoring device 3. This is a preferable method of checking a possible mismatch of the status information between the monitoring device 3 and the given transmission device 1.

Also, the given transmission device 1 sends the status information stored in the status-management-data storage unit 12 to the monitoring device 3 as a status-matching report when there is a mismatch of the status information between the monitoring device 3 and the given transmission device 1. This is a preferable method of enhancing a reliability of the monitoring device 3 checking the status information of the given transmission device 1.

The abridged status information attached to the polling command includes the abridged malfunction information, the abridged test-status information, the abridged detour-status information, and the abridged operation-pattern information. The abridged status information does not have to include all of the above-listed information, but may includes only some of the above-listed information.

Also, the given transmission device 1 may modify the status information stored in the status-management-data storage unit 12 instead of sending the status-matching report. This is preferable method of matching a plurality of the status information types at one time between the given transmission device 1 and the monitoring device 3.

Also, the given transmission device 1 does not send anything to the monitoring device 3 when there is no mismatch of the status information between the given transmission device 1 and the monitoring device 3. This is preferable in a sense that the processing load on the monitoring device 3 is reduced, and that the traffic on the monitoring line 8 and the transmission line 2 is reduced.

Also, the information attaching unit 50 may attach to the polling command the abridged status information of all the transmission devices 1 or a plurality of the transmission devices 1, and then sends the polling command by means of the multi-address communication. This is preferable in a sense that the status-matching process can be conducted at one time for all the transmission devices 1 or the plurality of the transmission devices 1.

Also, the information attaching unit 50 may attach response/no-response information to the polling command, and may send it by means of the multi-address communication. In this case, a given transmission device 1 for which the response/no-response information specifies the need of the response sends the response to the monitoring device 3 under any circumstances. This is a preferable method of checking whether the given transmission device 1 is in operation.

Also, the information attaching unit 50 may set an invalid value for the abridged status information of a given transmission device 1, if the given transmission device 1 has sent a report on a change of the status information since the issuing of a previous polling command. This is preferable in order to avoid an unnecessary status-matching processing carried out by the given transmission device 1.

Also, the information attaching unit 50 may periodically set the abridged status information to a predetermined pattern which is used for forcing a given transmission device 1 to report all the status information. This is a preferable method of collecting all the status information of the given transmission device 1.

According to the principle of the present invention, a time length required for compensating for the mismatch is reduced, compared to when a plurality of the status-matching commands are issued as in the related art. Also, a total time length required for the detection of mismatches for all the transmission devices 1 is reduced, since there is no need for the monitoring device 3 to wait for a response before issuing a next polling command. Also, the processing load on the monitoring device 3 is reduced.

In the following, an embodiment of the present invention will be described with reference to the accompanying drawings.

Figure 7:
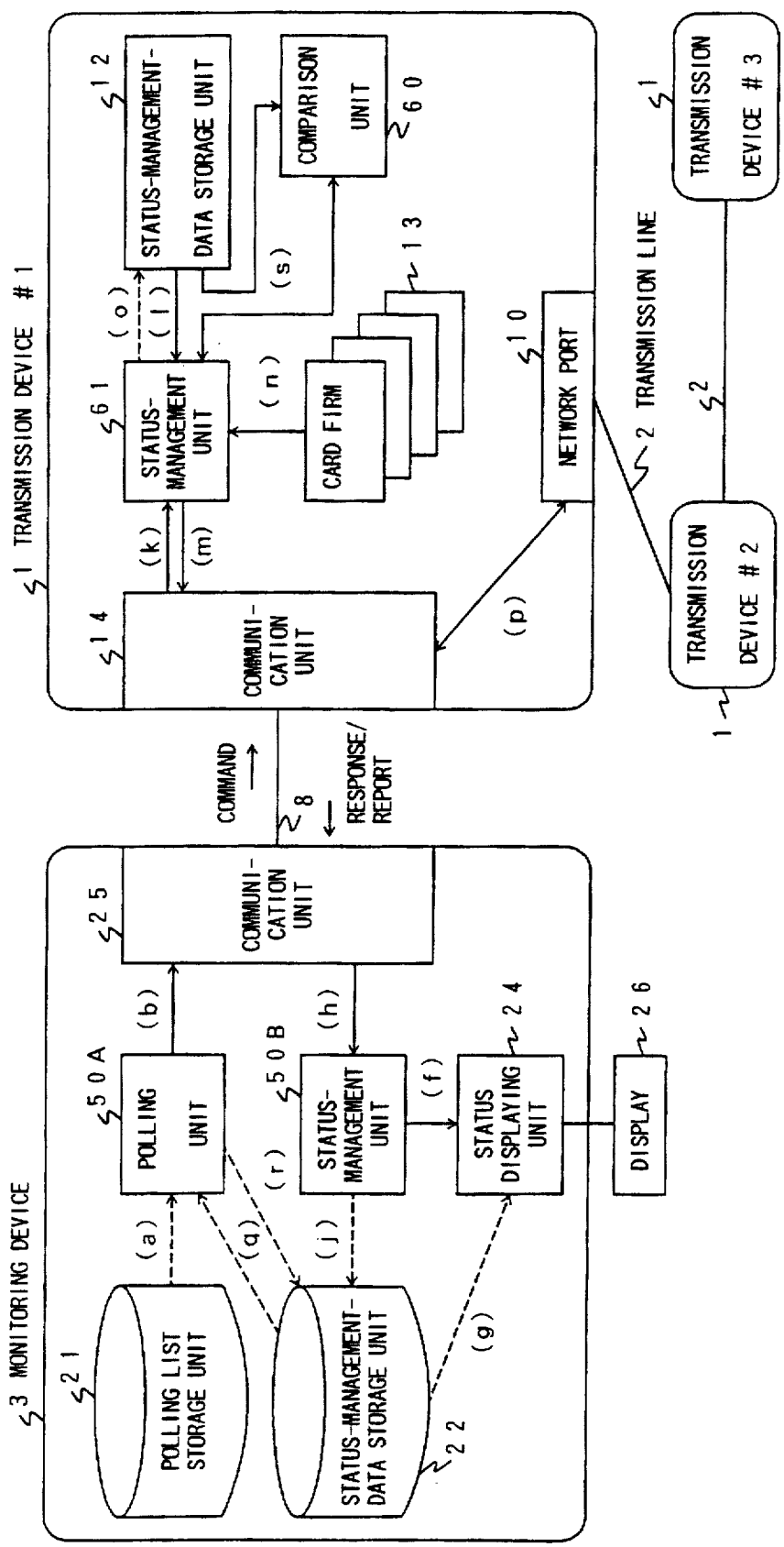
FIG. 7 is a block diagram of a network monitoring system according to an embodiment of the present invention.

FIG. 7 shows a block diagram of a network monitoring system according to the embodiment of the present invention. In FIG. 7, the same elements as those in FIG. 2 are referred to by the same numerals, and a description thereof will be omitted. In the figure, the network system includes the transmission devices 1 and the monitoring device 3 for controlling and monitoring the network. The transmission device 1 identified as #1 is connected to the monitoring device 3 via the monitoring line 8. Although only one monitoring device 3 is shown in FIG. 7, more than one monitoring device 3 may be provided. In this case, each of the monitoring devices 3 carries out an operation of the present invention for the transmission devices 1 under its supervision.

The transmission devices 1 are connected with each other via the transmission lines 2 and a network port 10. Each of the transmission lines 2 is provided with a predetermined frequency band specifically used for exchanging monitoring information between the transmission devices 1. Although the number of the transmission devices 1 is three in FIG. 7, it can be any number.

The monitoring device 3 includes a polling unit 50A, a polling-list storage unit 21, a status-management-data storage unit 22, a status-management unit 50B, a status-displaying unit 24, and a communication unit 25. The polling unit 50A carries out a polling process. The polling-list storage device 21 stores a polling list which contains addresses of all the transmission devices 1 connected to the network. This polling list is used by the polling unit 50A.

The status-management-data storage unit 22 stores the status-management data which is used for managing and storing the status information of the transmission devices 1. The status-management unit 50B analyzes a report on a status change sent from the transmission devices 1. The status displaying unit 24 updates status on a display 26, when the status-management unit 50B notifies the status displaying unit 24 of the status change reported in the report. The communication unit 25 is used for communicating with the transmission devices 1. The polling unit 50A and the status-management unit 50B make up the information attaching unit 50 of FIG. 6.

As described before, the monitoring device 3 is connected with one of the transmission devices 1, and communicates with each of the transmission devices 1 via the transmission lines 2. By doing so, the monitoring device 3 collects the status information from the transmission devices 1.

The polling unit 50A differs from the polling unit 10 of FIG. 2 in the following point. The polling unit 20 of the related art looks up the polling list, issues the polling command, and receives the polling response to compare the abridged status information with the status information stored in the status-management-data storage unit 22. Then, when there is a mismatch between these two, the polling unit 20 issues the status-matching command, receives the updated information as a response to the status-matching command, and passes the updated information to the status-management unit 23. On the other hand, the polling unit 50A of the present invention looks up the polling list, and issues the polling command after attaching the abridged status information of the transmission device 1 to the polling command.

Also, the status-management unit 50B of the present invention differs from the status-management unit 23 of FIG. 2 in the following point. The status-management unit 23 of the related art receives the reports from the transmission devices 1 and the updated information from the polling unit 20, and stores the status information in the status-management-data storage unit 22. Also, the status-management unit 23 notifies the status displaying unit 24 of a change in the status information. The status-management unit 50B of the present invention receives only the reports (the conventional reports and the status-matching reports), stores the status information of the report in the status-management-data storage unit 22, and notifies the status displaying unit 24 of a change in the status information.

Each one of the transmission device 1 includes a status-management unit 61, the status-management-data storage unit 12, the card firm 13, the network port 10, the communication unit 14, and a comparison unit 60.

The status-management unit 61 manages the status of the transmission device 1, and informs the monitoring device 3 of the status by means of the status-matching report. The status-management-data storage unit 12 stores the status-management data which contains the status information of a pertinent transmission device 1. The card firm 13 controls cards which are used for providing various interfaces. The communication unit 14 is used for communicating with the monitoring device 3. The network port 10 is used for communicating with the other transmission devices 1. The comparison unit 60 checks whether the abridged status information sent from the monitoring device 3 matches the status information stored in the status-management-data storage unit 12.

The status-management unit 61 of the present invention differs from the status-management unit 11 of FIG. 2 in the following point. The status-management unit 11 of the related art sends to the monitoring device 3 the report on a change of the status information detected by the card firm 13, sends to the monitoring device 3 in response to the polling command from the monitoring device 3 the abridged status information made from the status information stored in the status-management-data storage unit 12, and sends to the monitoring device 3 the updated information in response to the status-matching command from the monitoring device 3.

On the other hand, the status-management unit 61 of the present invention sends to the monitoring device 3 the report on a change of the status information detected by the card firm 13, and lets the comparison unit 60 compare the abridged status information attached to the polling command sent from the monitoring device 3 with the status information stored in the status-management-data storage unit 12. When there is a mismatch between these two, the status-management unit 61 sends to the monitoring device 3 the status-matching report concerning the mismatch, or may modify the status information stored in the status-management-data storage unit 12. When there is no mismatch, the status-management unit 61 sends nothing to the monitoring device 3.

In the embodiment, the comparison unit 60 may be included in the status-management 61 so as to be omitted.

In FIG. 7, "a" refers to a polling-list-reference operation, "b" refers to a polling-command issuing operation, "f" refers to a status-change notifying operation, "g" refers to a status-management-data reference operation, "h" refers to a report receiving operation, "j" refers to a status-information storing operation, "k" refers to a command receiving operation, "l" refers to a status-management-data reference operation, "m" refers to a response/report sending operation, "n" refers to a status-change notifying operation, "o" refers to a status-information storing operation, "p" refers to a communication with the other transmission devices 1, "q" refers to a status-management-data reference operation, "r" refers to a status-change/no-status-change information clearing operation, and "s" refers to a status-information checking operation.

Figure 8:
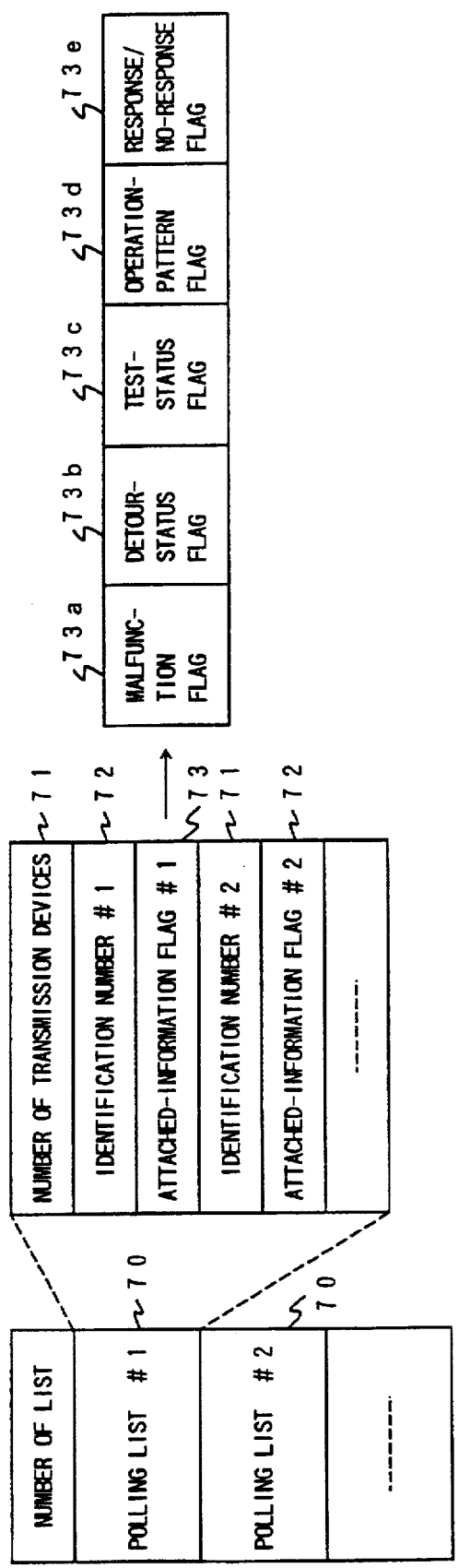
FIG. 8 is an illustrative drawing showing a configuration of a polling list used in the network monitoring system of FIG. 7.

FIG. 8 shows a configuration of the polling list. The polling list is not just a list of the transmission devices 1 existing in the network as in the related art. The polling list of the present invention includes identification numbers of the transmission devices 1 to which the polling command is sent, and includes attached-information flags which contain information regarding the abridged status information attached to the polling command.

The polling list includes a plurality of polling lists 70, each of which includes a number 71 of the transmission devices 1 contained in the list, an identification number 72, and an attached-information flag 73. The identification number 72 and the attached-information flag 73 are provided in the same number as the number of the transmission devices 1. The attached-information flag 73 includes a malfunction flag 73a, a detour-status flag 73b, a test-status flag 73c, an operation-pattern flag 73d, and a response/no-response flag 73e. Each of the flags 73a through 73e is set to 1 when corresponding abridged status information is attached to the polling command, and is set to 0 otherwise.

FIGS. 9A through 9D show data formats of the polling command, the response to the polling command, and the status-matching report responding to the polling command. FIG. 9A shows the polling command, FIG. 9B shows the polling command when it is sent through the multi-address communication, FIG. 9C shows the response, which may be sent to the monitoring device 3 to check if the transmission device 1 is in operation, and FIG. 9D shows the status-matching report, which is sent in response to the polling command.

As shown in FIG. 9A, the polling command includes a header 80, a response/no-response flag 81, abridged malfunction information 82, abridged detour-status information 83, abridged test-status information 84, and abridged operation-pattern information 85. When some of these types of information are meant to be invalid, a corresponding memory space is filled with "0xFFFF", which will be described later in detail.

As shown in FIG. 9B, when the polling command is sent through the multi-address communication to a plurality of the transmission devices 1, the header 80 is followed by abridged status information 91 provided for each of the transmission devices 1. The abridged status information 91 is the same as the information following the header 80 in the polling command of FIG. 9A, except for a device number 91a attached at the beginning. That is, the abridged status information 91 includes the device number 91a, the response/no-response flag 81, the abridged malfunction information 82, the abridged detour-status information 83, the abridged test-status information 84, and the abridged operation-pattern information 85.

Among these different types of the information, the abridged test-status information 84 concerns, for example, whether a loop-back test is conducted. Also, the operation-pattern information 85 concerns, for example, the switching of paths initiated by movement of a site.

As shown in FIG. 9C, a response to the polling command includes the header 80 only. A configuration of the header 80 is the same for all of the polling command, the response, and the status-matching report. The header 80 includes a device number 80a, a destination identifier 80b, a notice-content identifier 80c, a sequence number 80d, a command/report code 80e, a result code 80f, and a data size 80g.

The device number 80a is a number which is uniquely assigned to each of the transmission devices 1 in the network, and is 0xFFFF in the case of the multi-address communication. The destination identifier 80b is "1" for the transmission device 1 and "2" for the monitoring device 3. The notice-content identifier 80c is "1" for the command, "2" for the response, "3" for the (conventional) report, "4" for the status-matching report. The sequence number 80d is "0x0000" for one frame, is usually "0x1001" to "0x10FF" for more than one frame, and is "0x01XX" for the last frame (X is an arbitrary number). The command/report code 80e is a code used for identifying the command and the report. The result code 80f shows a result of the command. The data size 80g shows a data size of the portion following the header 80.

As shown in FIG. 9D, the status-matching report includes the header 80 and comprehensive information 101. The comprehensive information 101 includes the malfunction information, the detour-status information, the test-status information, and the operation-pattern information. As many pieces of the comprehensive information 101 are provided as needed.

In the embodiment of the present invention, the information attaching unit 50 is provided to attach the abridged status information of a given transmission device 1 to the polling command, which is sent from the monitoring device 3 to the given transmission device 1. Also, the comparison unit 60 is provided in each of the transmission devices 1 to check whether the abridged status information sent from the monitoring device 3 matches the status information stored in the status-management-data storage unit 12.

Thus, a comparison can be made on the side of the transmission device 1 to check whether the abridged status information reflecting the status information kept in the monitoring device 3 matches the status information kept in the transmission device 1. Then, a result of the comparison can be reflected back to the status information stored in the status-management-data storage unit 22 of the monitoring device 3.

Thus, according to the embodiment of the present invention, a time length required for compensating for the mismatch is reduced, compared to when a plurality of the status-matching commands are issued as in the related art. Also, a total time length required for the detection of mismatches for all the transmission devices 1 is reduced, since there is no need for the monitoring device 3 to wait for a response before issuing a next polling command. Also, the processing load on the monitoring device 3 is reduced.

A description of the polling process of the embodiment will be given below.

With reference to FIG. 7 again, the polling unit 50A of the monitoring device 3 sends the polling commands to the transmission devices 1 by using the polling list stored in the polling-list storage unit 21. When sending the polling commands, the polling unit 50A attaches to the polling commands the abridged status information, which is generated by looking up the status-management data stored in the status-management-data storage unit 22. The abridged status information includes numbers of the states.

Upon receiving the polling command, the transmission device 1 decides whether the abridged status information concerning itself is attached to the polling command. When there is no abridged status information concerning itself, the transmission device 1 passes the polling command to another transmission device 1 via the network port 10. When there is abridged status information concerning itself, the transmission device 1 makes the comparison unit 60 compare the abridged status information with the status information stored in the status-management-data storage unit 12.

If it turns out that there is no mismatch between these two, the transmission device 1 takes no action. This can reduce the load on the entire network system. If there is a mismatch, the status-management unit 61 of the transmission device 1 sends to the monitoring device 3 the status-matching report, which contains the status information relating to the mismatch. That is, the status-matching process which is carried out by the monitoring device 3 in the related art is conducted by the transmission device 1 in the present invention.

In doing so, the information relating to the mismatch which is sent via the status-matching report contains at least one of the malfunction information, the detour-status information, the test-status information, and the operation-pattern information which has a mismatch. In other words, different types of the information having mismatches may be collectively contained in a single status-matching report. Also, in order to distinguish the status-matching report from the conventional report, the notice-content identifier 80c of the header 80 is set to "4" for the status-matching report.

Basically, the polling process of the present invention does not require the response to be returned. However, when the response/no-response flag 81 of the polling command is set to "response", the response is returned under any condition regardless of the result of the comparison.

Since the monitoring device 3 does not require the response to the polling command and does not carry out the status-matching process, the monitoring device 3 can collect the status information of the transmission device 1 only through the report from the transmission device 1. The conventional report on a change of the status information or the status-matching information sent from the transmission device 1 is received by the status-management unit 50B. The status-management unit 50B stores in the status-management-data storage unit 22 the status information contained in the report. Also, the status-management unit 50B notifies the status displaying unit 24 of the change in the status information. Then, the status displaying unit 24 updates the status information shown on the display 26 by looking up the status-management-data storage unit 22.

When storing the status information, the status-management unit 50B sets status-change/no-status-change information to "status-change", which is stored in the status-management-data storage unit 22. Then, the polling unit 50A sets "0xFFFF" indicating the invalidity for a given type of the information in the polling command when the given type is indicated as "status-change" in the status-management-data storage unit 22. Then, the transmission device 1 does not carry out the comparison of the status information for the given type. Thus, the processing load can be reduced. This status-change/no-status-change information is cleared once the polling command is issued to a pertinent transmission device 1.

Figure 5A:
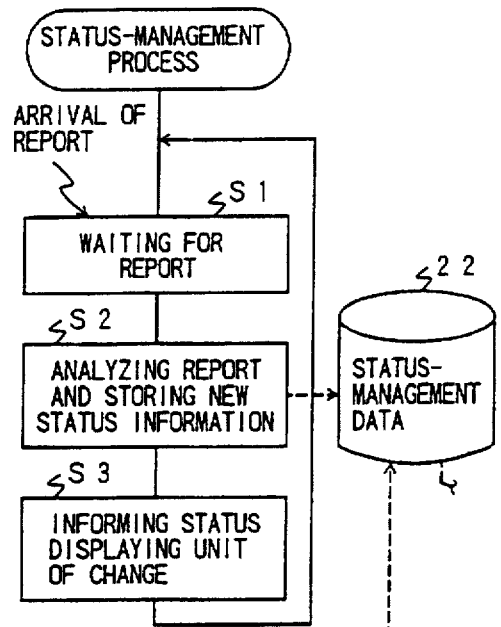
FIGS. 5A and 5B are flowcharts of processes of a monitoring device, which is used in the network monitoring system of FIG. 2.
Figure 5B:
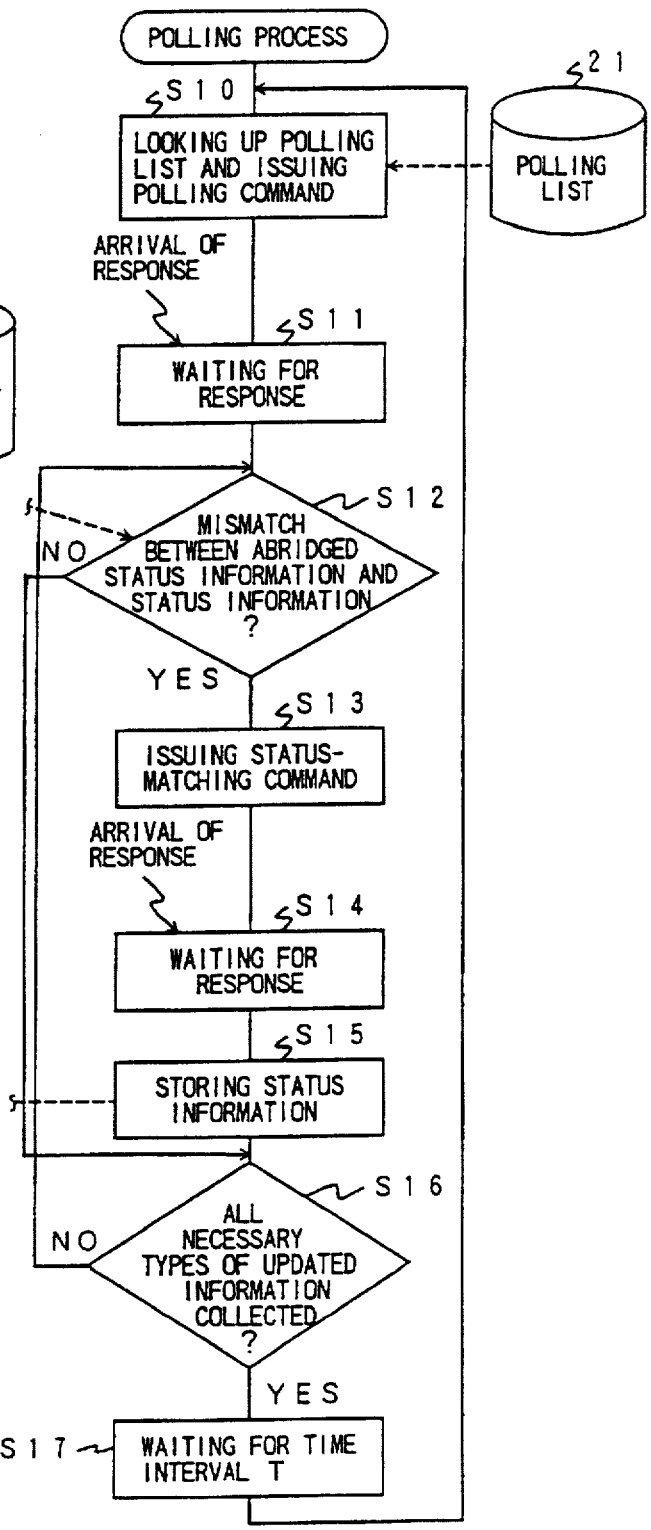

FIGS. 10A and 10B show flowcharts of processes of the monitoring device 3 according to the embodiment of the present invention. The same as in FIGS. 5A and 5B, the monitoring device 3 of the embodiment has the status-management process and the polling process, as shown in FIGS. 10A and 10B, respectively.

In FIG. 10A, at a step S101, the status-management unit 50B waits for the report (the conventional report or the status-matching report) to be sent from the transmission devices 1. When the report is received, the procedure goes to a step S102.

At the step S102, the contents of the report are analyzed, and new status information based on the analysis is stored in the status-management-data storage unit 22. That is, the status information of the pertinent transmission device 1 is updated. Since the report is concerned with the status information expected to be updated, the status-management data is updated under any condition. Also, at the step S102, the status-change/no-status-change information is set to "status-change" for the pertinent transmission device 1.

At a step S103, the change in the status is reported to the status displaying unit 24. The status displaying unit 24 updates the status displayed on the display 26. The procedure repeats the sequence described above.

In FIG. 10B, at a step S110, the polling unit 50A looks up the polling list stored in the polling-list storage unit 21, and acquires the attached-information flags concerning a given transmission device 1.

At a step S111, the polling unit 50A acquires the status information of the given transmission device 1, and generates the abridged status information based on the status information and the attached-information flags. This abridged status information includes the abridged malfunction information, the abridged detour-status information, the abridged test-status information, and the abridged operation-pattern information. Here, the polling unit 50A sets "0xFFFF" for a type of the information whose status-change/no-status-change information is indicated as "status-change", so that the given transmission device 1 does not have to make a unnecessary comparison. That is, when a given type of the information is known to be already updated through a report, it is unnecessary to confirm the status information of the given transmission device 1 through the polling command.

At the step S112, the polling unit 50A issues the polling command after attaching the abridged status information to the polling command.

At a step S113, the polling unit 50A clears the status-change/no-status-change information stored in the status-management-data storage unit 22. This is done in order to be prepared for a new change in the status information of the given transmission device 1.

At a step S114, the polling unit 50A lapses into a mode of waiting for a predetermined interval T. After the passage of the interval T, the procedure goes back to the step S110, and repeats the polling process described above.

Figures 11, 12:
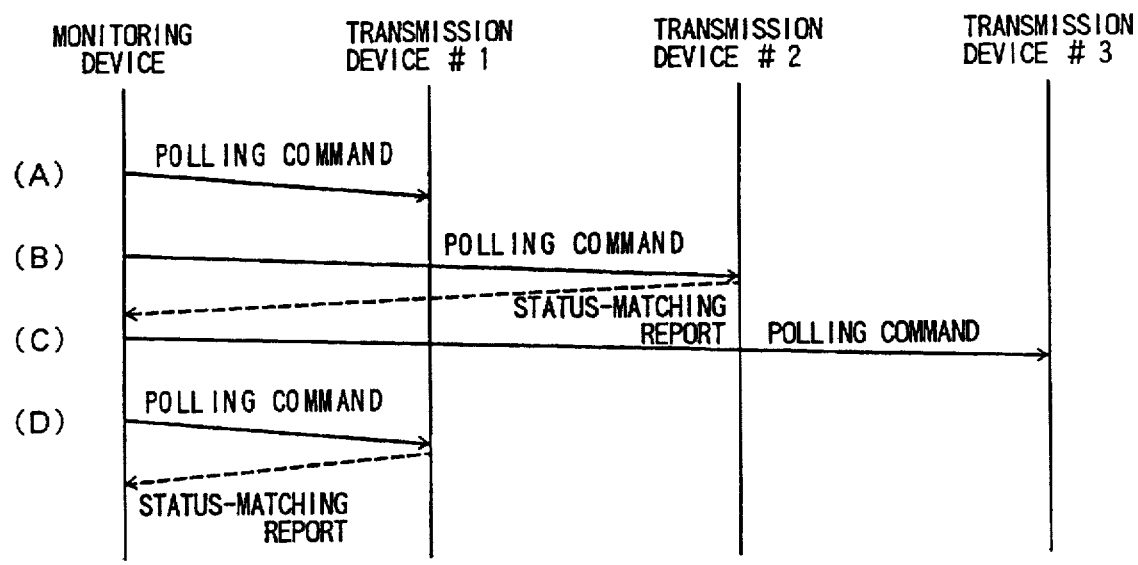
FIG. 11 is an illustrative drawing showing an example of an operation sequence of the network monitoring system of FIG. 7.
FIG. 12 is an illustrative drawing showing abridged status information corresponding to the example of FIG. 11.

FIG. 11 shows an example of an operation sequence of the embodiment, and FIG. 12 shows examples of the abridged status information corresponding to the example of FIG. 11. The example of the operation sequence of FIG. 11 shows a case in which one polling command is used for polling one transmission device 1. The malfunction information is a target of the polling command at a timing (A), the test-status information is a target of the polling command at a timing (B), the detour-status information is a target of the polling command at a timing (C), and the operation-pattern information is a target of the polling command at a timing (D).

The polling command at the timing (A) is targeted at the transmission device #1, wherein the abridged status information attached to the polling command is the number of malfunctions as shown in FIG. 12. The transmission device #1 receiving this polling command compares the abridged status information regarding the malfunction with the malfunction information stored in the transmission device #1. In this manner, the transmission device #1 can check the integrity of the status information between the monitoring device 3 and the transmission device #1.

In the example of FIG. 11, no mismatch is found in response to the polling command at the timing (A), and the response/no-response flag 81 (see FIG. 9A) is set to "no-response". Thus, the transmission device #1 sends nothing to the monitoring device 3. In this manner, the traffic load between the monitoring device 3 and the transmission devices 1 can be reduced.

The polling command at the timing (B) is targeted at the transmission device #2, wherein the abridged status information attached to the polling command is the number of tests as shown in FIG. 12. The transmission device #2 receiving this polling command compares the abridged status information regarding the test status with the test-status information stored in the transmission device #2.

In the example of FIG. 11, a mismatch is found in response to the polling command at the timing (B). Thus, the transmission device #2 sends the test-status information as the status-matching report to the monitoring device 3. In this manner, the test-status information of the transmission device #2 stored in the monitoring device 3 can be made more reliable.

The polling command at the timing (C) is targeted at the transmission device #3, wherein the abridged status information attached to the polling command is the number of detours as shown in FIG. 12. The transmission device #3 receiving this polling command compares the abridged status information regarding the detour status with the detour-status information stored in the transmission device #3.

In the example of FIG. 11, no mismatch is found in response to the polling command at the timing (C), and the response/no-response flag 81 is set to "no-response". Thus, the transmission device #3 sends nothing to the monitoring device 3. In this manner, the traffic load between the monitoring device 3 and the transmission devices 1 can be reduced.

The polling command at the timing (D) is targeted at the transmission device #1, wherein the abridged status information attached to the polling command is an operation-pattern number as shown in FIG. 12. The transmission device #1 receiving this polling command compares the abridged status information regarding the operation pattern with the operation-pattern information stored in the transmission device #1.

In the example of FIG. 11, a mismatch is found in response to the polling command at the timing (D). Thus, the transmission device #1 modifies the operation pattern information stored in the status-management-data storage unit 12, and sends resulting information on the modification as the status-matching report to the monitoring device 3. In this manner, the reliability of the network can be enhanced.

Figure 13:
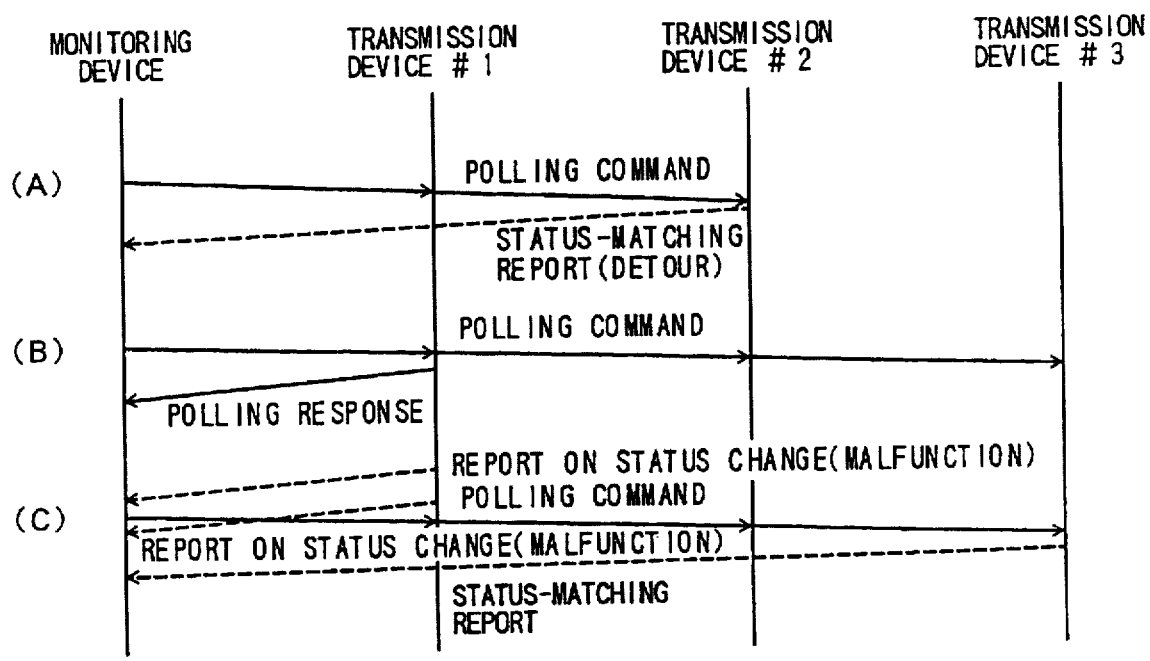
FIG. 13 is an illustrative drawing showing another example of the operation sequence of the network monitoring system of FIG. 7.

FIG. 13 shows another example of the operation sequence of the embodiment, and FIG. 14 shows examples of the abridged status information corresponding to the example of FIG. 13. With regard to the abridged status information shown in FIG. 14, each symbol represents the following, M: attaching the abridged malfunction information,
D: attaching the abridged detour-status information,
T: attaching the abridged test-status information,
O: attaching the abridged operation-pattern information,
I: attaching the invalidity code "0xFFFF", and
X: attaching a data string comprised of all 0s as the abridged status information.

As shown in the timing (C) of FIG. 14, all four types of the abridged status information (malfunction, detour status, test status, and operation pattern) are set to 0s. Also, the example of FIG. 13 shows a case in which one polling command is used for polling a plurality of the transmission devices 1, that is, the polling command is sent from the monitoring device 3 through the multi-address communication.

In FIG. 13, the polling command at the timing (A) is targeted at the transmission devices #1 and #2, and it is supposed that a mismatch in the detour-status information is detected at the transmission device #2. In this case, the status-matching report on the detour-status information is sent from the transmission device #2 to the monitoring device 3.

In FIG. 13, the polling command at the timing (B) is targeted at the transmission devices #1, #2, and #3. A format of the polling command used in the multi-address communication is shown in FIG. 9B. The abridged status information #1 is used for the transmission device #1, and the abridged status information #2 is used for the transmission device #2, for example. The abridged status information 91 is provided in the same number as the number of the transmission devices.

In the example of FIG. 13 and FIG. 14, the response/no-response information is set to "response" for the transmission device #1 as shown in FIG. 14, in order to check if this device is in operation. In this case, the transmission device #1 sends the response upon receiving the polling command, regardless of a result of the status-information comparison. Thus, the monitoring device 3 can confirm that the transmission device #1 is in operation.

The polling command at the timing (C) is also targeted at all the transmission devices 1. In this case, the conventional report on a change of the status information is sent from the transmission device #1 between the timing (B) and the timing (C). Also, the conventional report is issued right after the timing (B). In this manner, when there is a change in the status information immediately before or after the issuing of the polling command, the transmission device #1 is destined to detect a mismatch. However, the status-matching report sent from the transmission device #1 responding to the polling command is the same as the previous status-matching report. The status-matching report in this case unduly increases the traffic of communication.

For the transmission device #1, the abridged malfunction information 82 (see FIG. 9A) attached to the polling command is set to the invalid value "0xFFFF", because the malfunction information has been already reported since the previous polling process. Thus, the transmission device #1 receiving this command does not check on the mismatch of the malfunction information. In this manner, an excessive status-matching process can be prevented so as to reduce the processing load on the monitoring device 3.

Also, the abridged status information for the transmission device #3 is set to all 0s. Doing so forces the transmission device #3 to detect mismatches under any circumstance, so that all the status information of the transmission device #3 is reported via the status-matching report.

Collecting all the status information of a given transmission device 1 by setting 0s to all the abridged status information is useful in the following situation. The status-matching process is carried out by comparing the abridged status information with the status information, so that there may be a case in which the status information are actually different yet the abridged status information does not show any mismatch. In order to avoid the situation in which nothing is reported despite a difference in the status information, forcing the given transmission device 1 to report all the status information becomes necessary.

The above description has been provided with a particular configuration in which one monitoring device 3 and three transmission devices 1 are provided. However, the present invention is not limited to this configuration, and can be applied to a configuration, for example, in which a plurality of the monitoring devices 3 are provided at key locations, and each of them monitors an arbitrary number of the transmission devices 1 under its supervision.

In this manner, according to the present invention, the abridged status information of a given transmission device 1 is attached to the polling command, so that a mismatch of the status information is detected on the side of the transmission device 1. Then, only the status information relating to the mismatch is sent as the status-matching report when there is a mismatch, while nothing is reported otherwise.

Thus, the processing load on the monitoring device 3 can be reduced, and so can the complexity of the processing. Also, the communication traffic between the monitoring device 3 and the transmission devices 1 is reduced, so that the reliability of the network and the monitoring device 3 is enhanced.

Also, the abridged information of a plurality of the transmission devices 1 can be attached to the polling command to be used in the multi-address communication. Thus, a time length required for the detection of mismatches can be shortened, and the reliability of the monitoring device 3 can be enhanced.

The network monitoring system of the related art requires NT seconds maximum for the detection of the mismatches, when the number of the transmission devices 1 is N and the interval of the polling process is T seconds. In the present invention, only T seconds are needed for the detection of the mismatches, resulting in a time reduction by a factor of 1/N. In practice, the interval of the polling command is adjusted by taking into consideration the number of the transmission devices 1.

Also, the status-matching commands as needed in the related-art system are not necessary in the present invention, so that communication traffic can be reduced by a significant amount. Furthermore, the traffic between the monitoring device 3 and the transmission devices 1 is reduced and so is an occurrence of errors. Thus, the reliability of the monitoring device 3 is enhanced.

Further, the present invention is not limited to these embodiments, but various variations and modifications may be made without departing from the scope of the present invention.

What is claimed is:

1. A network monitoring system having at least one monitoring device and a plurality of transmission devices connected to a network, said network monitoring system comprising:

a first data storage unit, provided in said at least one monitoring device, which stores first status information of all of said transmission devices;

an information attaching unit, provided in said at least one monitoring device, which attaches abridged status information of at least one of said transmission devices to a polling command and sends said polling command to said at least one of said transmission devices, wherein said abridged status information is generated to reflect said first status information;

a second data storage unit, provided in each of said transmission devices, which stores second status information of a corresponding one of said transmission devices; and a comparison unit, provided in each of said transmission devices, which checks if there is a mismatch between said abridged status information of a corresponding one of said transmission devices and said second status information.

2. The network monitoring system as claimed in claim 1, further comprising a management unit, provided in each of said transmission devices, which sends said second status information relating to said mismatch to said at least one monitoring device if there is said mismatch, so that said at least one monitoring device can update said first status information.

3. The network monitoring system as claimed in claim 2, wherein said management unit is silent in the absence of said mismatch.

4. The network monitoring system as claimed in claim 3, wherein said management unit sends to said at least one monitoring device a response to said polling command when a need for said response is specified in said polling command, so that said at least one monitoring device can check if said transmission devices are in operation.

5. The network monitoring system as claimed in claim 4, wherein said polling command includes response/no-response information so as to specify if said response is necessary.

6. The network monitoring system as claimed in claim 3, wherein said management unit sends to said at least one monitoring device a report on a change of said second status information when said change occurs.

7. The network monitoring system as claimed in claim 6, wherein said abridged status information of a given one of said transmission devices attached to said polling command is set to an invalid value when said given one of said transmission devices has sent to said at least one monitoring device said report since a previous polling command, said comparison unit being in the absence of a check whether there is said mismatch when said abridged status information is set to said invalid value.

8. The network monitoring system as claimed in claim 3, wherein said abridged status information of a given one of said transmission devices is set to a predetermined pattern, so that said management unit of said given one of said transmission devices sends all of said second status information to said at least one monitoring device.

9. The network monitoring system as claimed in claim 8, wherein said information attaching unit sets said predetermined pattern once in a predetermined number of polling commands for each of said transmission devices.

10. The network monitoring system as claimed in claim 3, wherein said information attaching unit sends said polling command through multi-address communication when said abridged status information of a plurality of said transmission devices is attached to said polling command.

11. The network monitoring system as claimed in claim 1, wherein each of said first status information and said second status information includes at least one of malfunction information, test-status information, detour-status information, and operation-pattern information, and said comparison unit checks if there is said mismatch for each of said at least one of said malfunction information, said test-status information, said detour-status information, and said operation-pattern information.

12. The network monitoring system as claimed in claim 11, further comprising a management unit, provided in each of said transmission devices, which sends said second status information relating to said mismatch to said at least one monitoring device if there is said mismatch, so that said at least one monitoring device can update said first status information.

13. The network monitoring system as claimed in claim 12, wherein said management unit is silent in the absence of said mismatch.

14. A monitoring device for monitoring a network to which a plurality of transmission devices are connected, said monitoring device comprising:

a data storage unit which stores status information of all of said transmission devices;

an information attaching unit which attaches abridged status information of at least one of said transmission devices to a polling command, sends said polling command to said at least one of said transmission devices, and updates said status information based on a report sent from at least one of said transmission devices, wherein said abridged status information is generated to reflect said status information so that said at least one of said transmission devices can incorporate into said report information needed to update said status information, wherein said at least one of said transmission devices also checks to see if there is a mismatch between said abridged status information and second status information.

15. A transmission device connected to a network and monitored by a monitoring device which keeps first status information of said transmission device, said transmission device comprising:

a data storage unit which stores second status information of said transmission device;

a management unit which receives abridged status information of said transmission device attached to a polling command sent from said monitoring device, said abridged status information reflecting said first status information;

a comparison unit which checks if there is a mismatch between said abridged status information and said second status information.

16. The transmission device as claimed in claim 15, wherein said management unit sends said second status information relating to said mismatch to said monitoring device if there is said mismatch, so that said monitoring device can update said first status information.

17. The transmission device as claimed in claim 16, wherein said management unit is silent in the absence of said mismatch.

18. The transmission device as claimed in claim 17, wherein said management unit sends to said monitoring device a response to said polling command when a need for said response is specified in said polling command, so that said monitoring device can check if said transmission device is in operation.

19. The transmission device as claimed in claim 18, wherein said polling command includes response/no-response information so as to specify if said response is necessary.

20. The transmission device as claimed in claim 17, wherein said management unit sends to said monitoring device a report on a change of said second status information when said change occurs.

21. The transmission device as claimed in claim 20, wherein said comparison unit is in the absence of a check whether there is said mismatch when said abridged status information is set to an invalid value.

22. The transmission device as claimed in claim 17, wherein said management unit sends all of said second status information to said monitoring device when said abridged status information is set to a predetermined pattern.

23. The monitoring device as claimed in claim 14, wherein said information attaching unit sends said polling command through multi-address communication when said abridged status information of a plurality of said transmission devices is attached to said polling command.

* * * * *